US005916409A

United States Patent [19]

Mosburger

[11] Patent Number: 5,916,409

[45] Date of Patent: Jun. 29, 1999

[54] PROCESS AND DEVICE FOR HEATING A MOVING WEB

[75] Inventor: Hans Mosburger, Weiherhammer, Germany

[73] Assignee: BHS Corrugated Maschinen und Anlagenbau GmbH, Weiherhammer, Germany

[21] Appl. No.: 08/894,567

[22] PCT Filed: Feb. 1, 1996

[86] PCT No.: PCT/DE96/00157

§ 371 Date: Oct. 6, 1997

§ 102(e) Date: Oct. 6, 1997

[87] PCT Pub. No.: WO96/26829

PCT Pub. Date: Sep. 6, 1996

[30] Foreign Application Priority Data

Feb. 27, 1995 [DE] Germany ........................... 195 06 779

[51] Int. Cl.[6] .............................. B31F 1/28; B32B 31/26; F26B 3/24; F26B 13/06

[52] U.S. Cl. .......................... 156/322; 156/470; 156/499; 165/86; 165/89; 219/470; 432/8; 432/60

[58] Field of Search .................................... 156/205, 322, 156/472, 499; 432/8, 11, 59, 60; 219/469, 470; 34/117; 165/86, 89; 493/463; 264/286

[56] References Cited

U.S. PATENT DOCUMENTS

| | | | |
|---|---|---|---|
| 235,698 | 12/1880 | Newton | 264/286 |
| 2,008,974 | 7/1935 | Weber | 493/463 |
| 2,487,647 | 11/1949 | Goettsch | 156/472 |
| 3,694,927 | 10/1972 | Sorenson | 156/322 |
| 3,946,800 | 3/1976 | Evans | 165/89 |
| 5,344,520 | 9/1994 | Seki et al. | 156/472 |
| 5,389,183 | 2/1995 | Seki et al. | 156/472 |
| 5,614,048 | 3/1997 | Barny et al. | 156/472 |
| 5,783,006 | 7/1998 | Klockenkemper et al. | 156/205 |

FOREIGN PATENT DOCUMENTS 2708011 1/1995 France .

*Primary Examiner*—Richard Crispino
*Attorney, Agent, or Firm*—Dennison, Meserole, Scheiner & Schultz

[57] ABSTRACT

The process for heating a moving web, in particular a corrugated board web, in addition to a supply of heat to the one outer side of the moving web, also provides supply of heat to the other outer side of the web (5). A preheater (1) with a first heating face (3), which is associated with a movable deflection roll, is connected to a second heating face (13) connected to the deflection roll (10). With its other outer side, the web (5) is guided via this second heating face.

6 Claims, 2 Drawing Sheets

PROCESS AND DEVICE FOR HEATING A MOVING WEB

BACKGROUND OF THE INVENTION

The invention relates to a process for heating a moving web, in particular a corrugated board web, as well as a preheater.

A preheater for a corrugated board web has been disclosed by DE 23 02 449. This known preheater has a heating drum that is driven to rotate. The web is supplied via a stationary inlet to the heating drum and is carried away from it via a stationary outlet. The heating drum is associated with a deflection roll for the web, which can be pivoted concentrically around the central axis of the heating drum. The pivot angle determines the contact area of the web on the heating drum and therefore the heat quantity to be transmitted. The pivoted deflection roll carries the web along and moves it over the heating drum, wherein the winding angle can be adjusted. This produces the heat transfer from the heating face of the drum into the adjoining outer layer of the web. In order to prevent the incoming web from touching the outgoing web, normally a second roll is provided in the circumference direction of the heating drum. For safety reasons, these rolls are spaced apart from the rotating heating drum by 120 mm. It is disadvantageous that the web can only wind around the heating drum with a maximal angle of approximately 270°. Furthermore, the web can only be heated on one side by the heating drum, by means of which an uneven heating of the web takes place. There is also the danger that at high web speeds, due to the merely unilateral web heating, the adhesive applied in the adjoining adhesive mechanism does not set, i.e. develop a certain adhesive effect, rapidly enough.

SUMMARY OF THE INVENTION

The object of the invention is to establish a process and a device for heating a moving web, in particular a corrugated board web, by means of which it successfully increases the heating face without requiring more space and with a reduced construction cost. At the same time, an increased supply of heat and a more rapid heat transfer to adhesive application point should be made possible.

The invention eliminates the danger of intake between the deflection roll and the heating drum so that the safety distance prescribed by law between the deflection roll and the heating drum does not have to be heeded. In addition, the effective heating area is increased according to the invention, with a reduced space requirement and a reduced cost. Finally, the possible regulating range for the heat transfer is broadened. Also, the maximal winding angle of the heating drum can be enlarged by means of the web.

According to one embodiment of the invention, in a preheater of a known type, the rotary heating drum is associated with a heating face in the shape of a circular segment that is connected to the deflection roll so that it can be moved concentrically to the heating drum, wherein the other outer side of the web is guided via this circular segment-shaped heating face and rests against it.

BRIEF DESCRIPTION OF THE DRAWINGS

The invention will be explained in detail below in conjunction with an exemplary embodiment represented in the drawings.

DESCRIPTION OF THE PREFERRED EMBODIMENTS

Figure 1:
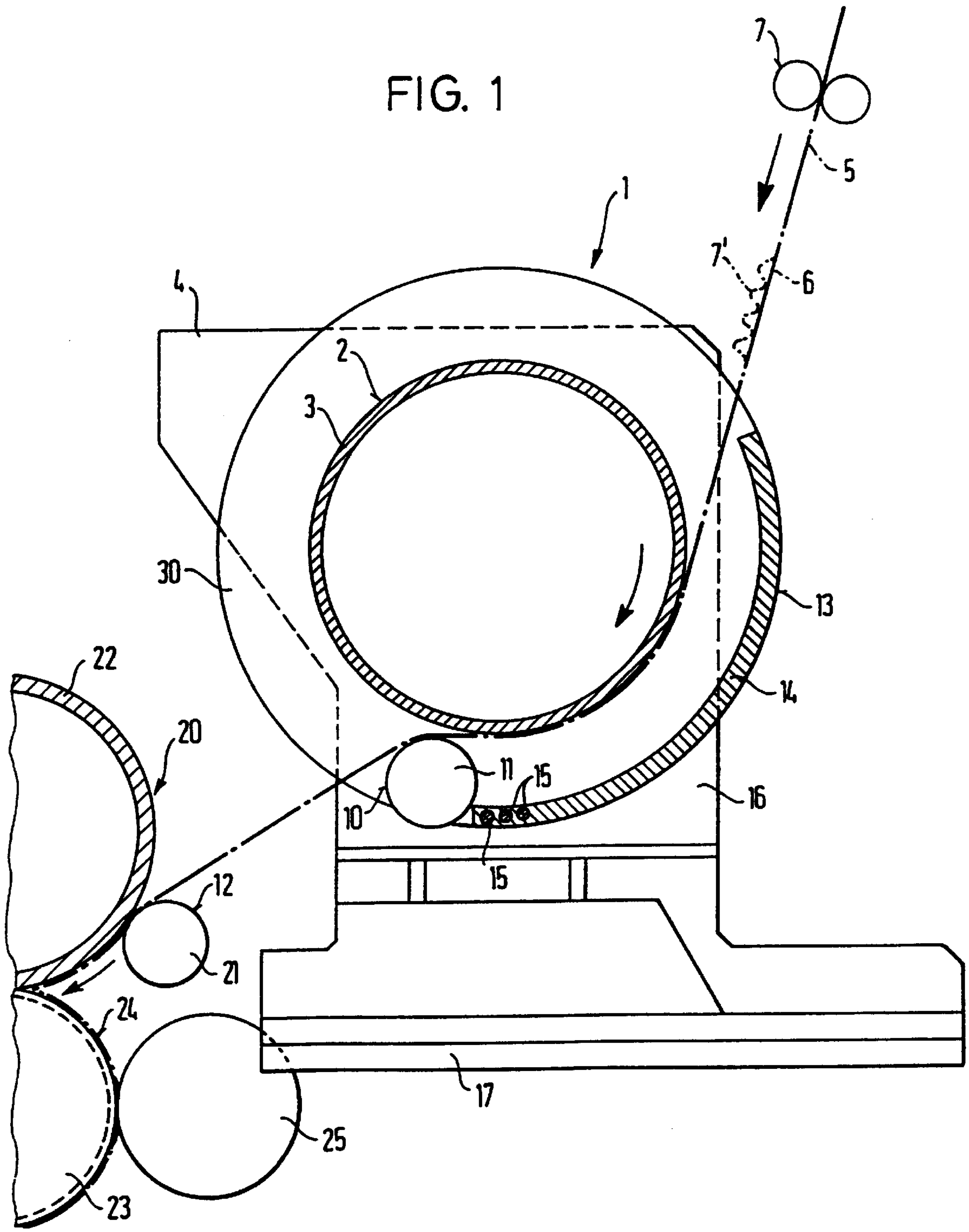
FIG. 1 shows a partially sectional schematic representation of a preheater according to the invention, with the minimum winding angle of the web around the heating drum in connection with a unilateral corrugated board machine
Figure 2:
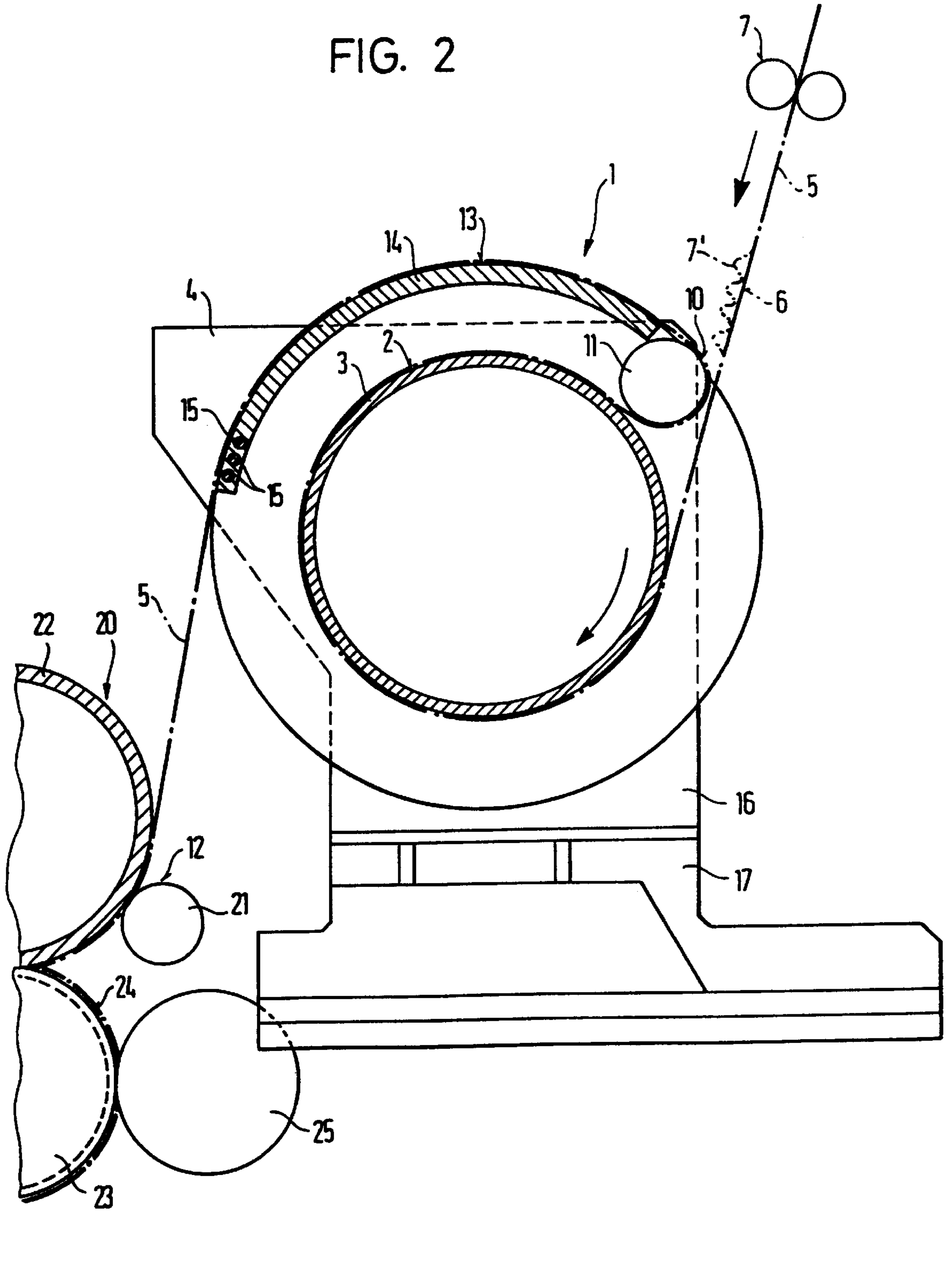
FIG. 2 shows a view of a preheater like the one in FIG. 1, with the maximal winding angle of the web around the preheating drum.

The preheater 1 according to FIGS. 1 and 2 has a heated drum 2 with a smooth surface. This can be internally heated, e.g. by means of steam or in some other way. The drum 2 can be driven in the indicated arrow direction. However, it can also be supported merely so that it can rotate. The drum jacket 3 is comprised of highly heat-conducting material, preferably steel. The drum 2 is supported on both ends in bearing plates 4.

The web 5, e.g. a cover web for a unilateral corrugated board web, travels via an inlet 7, which is embodied, for example, as a stationary pair of rolls, toward the drum 2 in the indicated arrow direction.

According to FIG. 1, the web 5 rests against the heated drum jacket 3 and winds around it with the smallest possible winding angle, e.g. 72°.

On its way out, the web 5 is guided via a deflection face 10, e.g. a rotary deflection roll 11. From the roll 11, the web 5 travels further to a stationary outlet 12. According to FIG. 1, the web 5 travels to a unilateral corrugated board machine 20, for example. In this connection, the guide roll 21 can cooperate with the press roll 22. This press roll cooperates in the usual manner with the corrugator roll 23 and the adhesive transfer roll 25 transfers the adhesive from the adhesive mechanism, not shown, onto its corrugated paper web 24, which adhesive transfer roll 25 is disposed at a foot 17 with an insert guide. Naturally, the outlet 12 can also be embodied in other ways.

The deflection face 10 is connected to a heating face 13, which is comprised of a heatable circular segment 14 made of metal, which is disposed concentric to the central axis of the drum 2.

The heating face 13 and the deflection face 10, which is embodied in the concrete exemplary embodiment as a deflection roll 11, are disposed so they can be pivoted together around the central axis of the drum 2.

For this, the deflection roll 11 and the heating face 13 can be connected to circular disks 30 that can be rotated around the central axis of the heating drum 2 and can be moved by means of an adjusting device, e.g. by means of chains.

In FIG. 1, the deflection roll 11 with the heating face 13 is disposed in a position with the smallest winding angle, e.g. 72°. The web 5 does not travel via the heating face 13.

In addition to the one outer side of the web 5 (in a unilateral corrugated board web, the corrugated web 7'), if the intent is to heat the other outer side of the web (in a unilateral corrugated board web, the smooth web 6), then as can be seen from FIG. 2, the deflection face 10 with the heating face 13 is pivoted clockwise around the central axis of the drum 2. The size of the pivot angle depends on the heat to be transmitted into the web 5. The pivot angle can be adjusted manually or automatically, e.g. as a function of web moisture, web temperature, and/or web speed.

The incoming web 5 defines the maximal pivot angle.

Due to the pivoting of the deflection face 10 with the heating face 13, the web 5 winds more and more around the drum 2 and it returns in the opposite direction, pressed against the heating face 13. After leaving the heating face 13, the web 5 travel to the outlet 12.

The heating face 13 can be provided with meandering heating conduits 15 or electrical heating wires. A hot medium, e.g. a heating steam, can be guided through the heating conduits.

The roll 11 can be rotated as the deflection face 10. It can also be driven if need be.

The separable foot 17 of the lateral plates 4 is disposed as close as possible to the imaginary circular path of the circular segment 14. The foot 17 can, for example, directly receive an insertable adhesive mechanism 17 or the like, not shown, which is disposed underneath it. As a result, the heated drum 2 and the heating face 13 are positioned very close to the adhesive transfer point on the circumference of the adhesive transfer roll 25. By means of this, an unnecessary heat loss is prevented during the movement of the web 5 from the preheater 1 to the adhesive transfer point. The space requirement is reduced.

What is claimed is:

1. A process for heating a moving web having first and second faces, comprising the steps of:

heating the first and second faces of the web by deflecting the web from a first heating device comprising a drum having a first, curved heating face that heats an area of the first face of the web in contact therewith to a second heating device comprising a semicircular segment having a second, curved heating face that heats an area of the second face of the web in contact therewith, and further comprising a deflection roll for the web, and moving the second heating device concentrically around the first such that the area in contact with and heated by each of the heating faces is changed.

2. The process according to claim 1, wherein the heating faces are heated by means of heat conduction.

3. The process according to claim 1, wherein the moving web is guided through a first fixed position before contact with the first heating face and through a second fixed position after contact with the second heating face.

4. The process according to claim 1, wherein the web is a corrugated board web.

5. A preheater for a moving web having first and second faces, comprising:

a first heating device comprising a rotatable drum having a first, curved heating face for heating an area of the first face of the web wound around and in contact with the first heating face, a second heating device comprising a semicircular segment having a second, curved heating face for heating an area of the second face of the web wound around and in contact with the second heating face, and further comprising a deflection roll for the web, the second heating device being located outside of the rotatable drum, first and second guide means for the web fixed in location upstream of the first heating device and downstream of the second heating device, respectively, and means for moving the second heating device concentrically around the first heating device, such that the area of the web in contact with and heated by the first and second heating faces is changed.

6. The preheater according claim 5, additionally comprising a foot supporting the first and second heating devices.

* * * * *